United States Patent [19]

Canova

[11] Patent Number: 4,738,892

[45] Date of Patent: Apr. 19, 1988

[54] SILICA FILLER FOR EPOXY ENCAPSULANTS AND EPOXY ENCAPSULANTS CONTAINING SAME

[75] Inventor: Levy A. Canova, Orange Park, Fla.

[73] Assignee: PCR, Inc., Gainesville, Fla.

[21] Appl. No.: 781,025

[22] Filed: Sep. 27, 1985

[51] Int. Cl.$^4$ .......................... B32B 7/02; B32B 9/04
[52] U.S. Cl. .................................. 428/219; 428/405;
  428/446; 428/219; 106/308 Q
[58] Field of Search .................... 106/308 Q; 428/405,
  428/219, 446

[56] References Cited

U.S. PATENT DOCUMENTS 3,455,877 7/1969 Plueddemann ...................... 549/215
4,297,145 10/1981 Wolff et al. ...................... 106/308 Q

*Primary Examiner*—Edith Buffalow
*Attorney, Agent, or Firm*—Robert A. Sturges

[57] ABSTRACT

There is provided an improved silica filler for resins which silica filler is coated or reacted with an alkoxyepoxyterpene silane. The resins containing such filler are characterized by improved dielectric constant and dissipation factor.

17 Claims, No Drawings

SILICA FILLER FOR EPOXY ENCAPSULANTS AND EPOXY ENCAPSULANTS CONTAINING SAME

This invention relates as indicated to the improvement of the electrical properties of epoxy encapsulating materials or potting compounds, and more particularly to the treatment of filler materials contained in such encapsulants and potting compounds. The invention also relates to epoxy resins containing the fillers of the present invention.

BACKGROUND OF THE INVENTION AND PRIOR ART

The casting of a pourable material into an open mold is perhaps the oldest fabrication technique still being used by the plastics industry. Encapsulation, potting and casting are all similar processes used to produce different types of products.

Encapsulation or embedment, is generally understood to refer to embedding an object completely in a plastic material. A rose or commemorative coin that is encapsulated in an acrylic resin is an example. A cardiac pacemaker is encapsulated in a silicone resin in order to render the parts compatible with live tissue. Encapsulation is normally achieved with a reusable mold.

Potting is very similar, except that the mold normally becomes a part of the final product. Placing delicate electrical components inside a plastic box and pouring plastic into the space between the box and the components is a type of potting.

Encapsulation and potting have the same end objective of protecting the enclosed components from external, mechanical or environmental attack. Crystal clear acrylic is used to display, capture and hold the otherwise temporary beauty of a flower. Electrical components which must be visually inspected or read through the potting material are potted in clear acrylic or transparent polyester or epoxy. If protection against impact or shock loading is important, the parts may be surrounded by a self-rising urethane foam. Silicones are used to provide an excellent moisture and heat resistance.

Epoxy resins, because of their dielectric strength, low shrinkage upon cure, good adhesion, and ability to retain properties under varying environmental conditions are reasons why the electrical and electronic industry is a major consumer of such epoxy resins.

Epoxy resins also exhibit good volume resistivity, low dissipation factor, and good dielectric strength as well as high mechanical strength at elevated temperatures and high humidity. Semi-conductors, transistors, and integrated circuits use highly filled epoxies because of the high temperature resistance, low shrinkage, and reliability needed in these electronic devices. (See Modern Plastics Encyclopedia, 1982, 1983, Page 34, Modern Plastics Encyclopedia, 1983-1984, Page 24.).

For most uses, epoxy resins are filled with a particulate inorganic filler, especially silica. The silica may be fumed silica, hydrated silica, silica aerogels and silica xerogels, and have an average particle size in the range of 0.05 to 20 microns. In addition to decreasing costs, these fillers serve to increase hardness, act as a heat sink for the exothermic curing reaction, decrease shrinkage during curing, add opacity and color, and improve other general processing and performance parameters. Silanes are extensively used in many electrical grade silica-filled epoxy resin systems (Moreland, Netherlands Pat. No.: 6901148 filed 23 Jan. 1969). The primary purpose is retention of electrical insulation and low loss properties after extensive exposure to water. The use of 1% epoxysilane-treated, naturally occurring silica in an electrical epoxy resin system has been shown to provide improvements in both and dry flexural strength and complete retention of electrical properties after extensive water immersion (Moreland, Ibid.). (See the article in "Composite materials" by Broutman and Krock, Volume 6, the article entitled "Silane Coupling Agents in Particulate Mineral Filled Composites" at Page 143).

Reference may also be had to U.S. Pat. No. 4,151,154 which discloses metal oxide particles, e.g., silica, treated with a polyether substituted silicon compound alone or in combination with a different silane having the formula $R_n{}^3—Si(X_{4-n})_b$ where $R^3$ is an organic radical of 1 to 18 carbons and X is a hydrolyzable group, e.g., alkoxy. These silicas so treated are used in various resins including epoxies. U.S. Pat. No. 4,414,272 discloses various polyester resins containing silica particles treated with a silane.

It has now been found most surprisingly that several terpene derived silane esters are decidedly superior to materials currently used to provide good electrical properties in silica/epoxy composites when exposed to hot water. This is a test usually carried out to predict long term properties in a humid environment.

These silane esters can be added directly to a mixture of the epoxy formulation before curing or they can be precoated onto the surface of the filler material. Excellent results are obtained in each case.

BRIEF STATEMENT OF THE INVENTION

Briefly stated, the present invention is in a particulate silica filler having an average particle size in the range of from 0.5 to 20 microns and a surface area of from 0.5 to 5 square meters per gram, the surface of said particles having reacted therewith or coated thereon from 0.1 to 2.5% by weight of the silica of an alkoxysilane having the general formula:

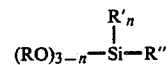

wherein R is a $C_1$–$C_4$ alkyl group, R' is selected from $C_1$–$C_4$ alkyl groups, R'' is a cyclic terpene radical or an acyclic terpene radical, preferably containing 10 carbon atoms and an oxirane group, n is 0, 1 or 2.

The preferred silane materials are di- or tri-alkoxy silanes in which the aliphatic group(s) attached to silicon directly with a carbon-silicon bond are a terpene derived radical(s) containing 10 carbon atoms and an epoxy group.

DETAILED DESCRIPTION OF THE INVENTION

There are two ways in which the advantages of the present invention can be realized. The first involves treating the silica filler with a small amount of the alkoxy terpene epoxy silane, and thereafter adding the filler to the uncured epoxy resin and coreactant for hardening the resin. Alternatively, and equally effectively, the alkoxy terpene epoxy silane may be blended in with a suitable epoxy resin and the silica filler intimately blended with the combination. In the latter case, the alkoxy terpene epoxy silane also reacts with or coats the surface of the silica to achieve the advantages of the present invention. The invention of the present application is not in the treatment of silica with epoxy silane coupling agents either insitu or exsitu, but in the particular silanes which are used to treat the silica. These advantages will be demonstrated below.

The preferred alkoxy terpene epoxy silanes for use in accordance with this invention are terpene derived silanes. These silanes are believed to be novel and have been fully described in the application of Kremer, Cardenas and DePasquale, Ser. No.: 658,555 filed 9 Oct. 1984 and entitled "Novel Terpene Derived Functional Silanes". To prepare these silanes, there are first prepared certain olefin epoxides in accordance with Examples 1-5 below.

The fillers of the present invention are especially useful with epoxy resins. Numerous examples of epoxy resins are known, examples of which are given in prior patents listed below. The silica fillers of the present invention are useful in curable or hardenable epoxy resin compositions in amounts ranging from about 50 phr to about 250 phr.

The general formula for the alkoxyepoxyterpene silanes hereof is given above. As indicated, the R and R' groups are $C_1$-$C_4$ alkyl and include, therefore, methyl, ethyl, propyl, isopropyl, n-butyl, isobutyl, and tertiary-butyl. R and R' may be the same or different.

EXAMPLE 1

3S-Dihydromyrcene-6,7-epoxide

To an ice-cooled, stirred mixture of 680 g (5.0 mol.) 3S-dihydromyrcene, 400 g of sodium carbonate in 400 ml. of methylene chloride was slowly added 800 ml. of 40% peracetic acid, while keeping the internal temperature below 30° C. After stirring overnight, the liquid was decanted to a separatory funnel. The oil was separated, washed with sodium sulfite solution and then with sodium carbonate, dried over magnesium sulfate, and evaporated to dryness. Distillation of the product on a 2' column gave 607.7 g (80% yield) of epoxide, bp 84°-87° C./25 mm.

EXAMPLE 2

Myrcene-6,7-epoxide

Epoxidation of 680 g of myrcene was carried out in exactly the same manner as the above example to give the myrcene-6,7-epoxide, bp 78-80, C/16 mm.

EXAMPLE 3

(cis- and trans-)4R-Limonene Oxide

A mechanically stirred mixture of 1 kg. (7.3 mol.) of d-limonene (7.3 mol.) and sodium carbonate (310.6 g) was cooled to 0°-10° C., and treated with 1.61 kg. (9.1 mol.) 40% peracetic acid by dropwise addition. After the addition was complete, the reaction mixture was stirred for another 45 min., washed with ice water, sodium carbonate, and brine. The oil was dried over magnesium sulfate, and distilled to give recovered limonene (30 g), the cis-epoxide (257 g) and trans-epoxide (296 g), and diepoxide (82 g).

The foregoing epoxy olefins may be hydrosilylated in accordance with the following examples:

EXAMPLE 4

3S-6,7-Epoxycitronellyltriethoxysilane

A solution of 25 g (0.162 mol.) 3S-dihydromyrcene-6,7-epoxide from Example 1, and 27 g (0.164 mol.) triethoxysilane was heated to 50° C. To the solution was added 30 cc of a 1% w/v solution of chloroplatinic acid in acetone dropwise, keeping the temperature between 60°-70° C. After addition, the solution was kept at 70° C. for 3 hours. GLC of the reaction mixture showed 78% conversion of reactants to a dominant product. The titled compound was isolated by distillation, bp (180° C./0.1 mm.) (39 g, 75% yield) NMR (CDCl$_3$) 0.5-0.8 (m, 2), 0.9 (bd, 3), 1.21 (t, 9), 1.29 (s, 3), 1.31 (s, 3), 1.4-1.8 (m, 7), 2.7 (bt, 1), 3.8 (q, 6) ppm; IR (neat film, cm$^{-1}$) 2900, 1440, 1370, 1180-1140, 945, 750.

EXAMPLE 5

3S-6,7-Epoxycitronellylmethyldiethoxysilane

Methyldiethoxysilane (22 g, 0.164 mol.) was added to a solution of 3S-dihydromyrcene-6,7-epoxide from Example 1, (25 g, 0.165 mol.) and 10 ml. of 1% chloroplatinic acid hexahydrate in acetone. The resultant solution was heated to 57° C. for 4 hours. A GLC Of the cooled reaction mixture showed 89% conversion to a dominant product. The titled compound was isolated by distillation bp 180°/0.1 mm., (40 g, 85% yield). NMR (CDCl$_3$) 0.05 (s, 3), 0.5-0.8 (m, 2), 0.9 (bd, 3), 1.2 (t, 6), 1.28 (s, 3), 1.31 (s, 3), 1.4-1.8 (m, 7), 2.7 (bt, 1), 3.8 (q, 4) ppm; m/e (70 ev) 288 (m+).

In an analogous manner, trimethoxysilane and methyldimethoxysilane were added to 3S-dihydromyrcene-6,7-epoxide.

EXAMPLE 6

3S-6,7-Epoxycitronellyltrimethoxysilane bp (130° C., 0.1 mm.) (35% yield). GLC, 6'×⅛" 10% SP 2100 on Supelcoport. Initial temperature 50° C. for 2 min., 16°/min. to 250° C. carrier flow 20 cc/min. Retention time 13.02 min. NMR CDCl$_3$ 0.5-0.7 (m, 2), 0.9 (bd, 3), 1.28 (s, 3) 1.34 (s, 3) 1.4-1.8 (m, 7), 3.7 (bt, 1), 3.5 (s, 9) ppm; m/e (70 ev) 276 (m+).

EXAMPLE 7

3S-6,7-Epoxycitronellylmethyldimethoxysilane bp (120°, 0.1 mm.) (55% yield) GLC analysis on a 6'×⅛" 3% SP 2100 on Supelcoport: Initial temperature 50° C. for 2 min. 16°/min. to 250° carrier flow 20 cc/min., retention time 11.93 min., m/e (70 ev) 260 (m+).

EXAMPLE 8

6,7-Epoxygeranyltriethoxysilane

Triethoxysilane (41 g, 0.25 mol.), myrcene epoxide from Example 2, (38 g, 0.25 m) and 2.5 ml. of a 1% w/v solution of chloroplatinic acid in acetone were mixed together in a Fischer Porter bottle. The bottle was sealed and heated to 105° C. for 6 hours. Analysis by GLC indicates 30% conversion to titled compound. The product was purified by distillation, bp 180°/0.1 mm.), affording 20 g (25%) yield. NMR (CDCl$_3$) 1.2 (t, 9), 1.25 (s, 3) 1.32 (s, 3) 1.4-1.8 (m, 2) 1.9 (s, 3) 2.1-2.4 (m, 4), 2.7 (t, 1) 3.85 (q, 6) 4.5-5.2 (m, 1) ppm; IR (neat film cm$^{-1}$) 2900, 1480, 1390, 1180-1120, 955.

EXAMPLE 9

4R-1,2-Epoxymenthyltriethoxysilane

To a solution of (cis- and trans-)4R-limonene oxide, Example 3, (50 g, 0.33 mol.) and triethoxysilane (55 g, 0.335 mol.) was added 3 g of 5% Pt on C. The solution was heated to 108° C. for 14 hours. The product was isolated by filtration and distillation, bp 120° C. (0.1 mm.) 50 g, (48%). NMR CDCl$_3$ 0.5-0.9 (m, 2) 0.9 (d, 3), 1.2 (t, 9) 1.3 (s, 3) 1.3-2 (m, 9) 3.0 (bd, 1) 3.9 (q, 6) ppm; IR (neat film cm$^{-1}$) 2900, 1430, 1390, 1180-1050, 940; m/e (70 ev) 316 (m+).

EXAMPLE 10

2-(Beta-triethoxysilyl)ethyl-5,6-epoxynorbornane

To a solution of 6-(2,3-epoxynorbornyl)ethylene from Example 4 (68 g, 0.5 mol.) containing 1 ml. of 1% chloroplatinic acid hexahydrate in acetone was slowly added triethoxysilane (85 g, 0.52 mol.) at 110° C. over a 2 hour period. After addition, the solution was analyzed by GLC showing an 83% conversion. The titled product was purified by distillation bp 120° C. (0.1 mm.) yielding a colorless mobile liquid (90 g, 60%).

The following spectroscopic characteristics are consistent with the titled structure: NMR CDCl$_3$ 0.5-0.9 (m, 4) 1.2 (t, 9) 1.2-1.9 (bm, 4) 2.5 (bs, 2) 3.1 (d, 2) 3.1 (d, 2), 3.85 (q, 6) ppm; IR (neat film) cm$^{-1}$, 3900, 1420, 1380, 1350, 1330, 1150, 1090, 950, 850.

The silica can be treated with the epoxy silane either externally of the resin or internally of the resin. In either case, the silane associates itself with the silica.

A procedure for compounding an epoxy resin composite with silica either pretreated with the epoxy silane coupling agent or post treated internally of the resin-silica mix is as follows:

A typical formulation for compounding is as follows:

| Ingredient | Wt. % | Grams |
|---|---|---|
| Epon 828[1] | 30.4 | 326.8 |
| ECA-190[2] | 17.4 | 187.05 |
| Benzyl dimethyl-amine catalyst | 0.2 | 2.15 |
| Silicone antifoam agent | | 17 drops |
| Silica[3] filler | 52.0 | 559 |
| | 100.0 | 1075 |

[1]Diglycidyl ether of bisphenol-A, Shell Chemical Co. Epoxide equivalent 175-210, avg. m.w. 350-400. Viscosity 5000 to 15000 centipoises (cps).
[2]Methyltetrahydrophthalic anhydride - co-reactant.
[3]10 micron microcrystalline silica filler, Whitaker, Clark & Daniels.

The resin, co-reactant, catalyst and antifoam agent are added to a suitable vessel and well mixed to form a resin mix. The silica is added in 50-100 gram increments and well mixed by hand for about 5 minutes each with the resin mix. At this point the silica should be fairly well wetted with the resin mix. The mix is then slowly stirred mechanically for 1 hour.

The resin-filler mix is placed in a vacuum desiccator to degas the sample prior to casting.

Other epoxide encapsulating resins which may be used herein and their preparation are those described in U.S. Pat. Nos. 2,467,171; 2,615,007; 2,615,008; 2,801,227; 2,538,072 and 2,033,803 which patents are incorporated herein by reference.

As the resin-filler mix begins to rise and froth under vacuum, the vacuum is repetitively momentarily released by introducing air into the desiccator over a period of about 45 minutes until frothing subsides. Thereafter the vacuum is held for about 2 hours until most of the air bubbles have been removed. The resin-filler mix is cooled in a 32° C. water bath for 2 hours with a cover on the container or potting.

The resin-filler mix is ready for molding, encapsulating. Curing is effected at 100° C. for 2 to 3 hours followed by a post-curing heat treatment at 125° C. for up to 4 hours.

Addition of the silane coupling agent is preferably made directly to the silica. For this purpose, a pre-hydrolyzed silane formed as follows is used. For each 100 grams of silica filler to be treated, 1 gram of silane is weighed out. For each 1 gram sample of silane, 100 cc of 90 wt. % methanol 10% water buffered to a pH of 4.5-5.0 with glacial acetic acid is added and slowly mixed with a magnetic stirrer for 30 minutes.

The pre-hydrolyzed terpene epoxy silane is added directly to the silica in a blender and thoroughly mixed. The treated silica is then dried, conveniently as a 1" thick layer in an aluminum pan. The pan is placed in an oven and dried for about 2 to about 20 hours at a temperature of from 50° to 105° C. The higher the temperature, the shorter the time of drying. Where the silane is heat sensitive, the lower temperatures, e.g., 50°-60° C. for the longer period, 18-20 hours, are preferred. The pre-hydrolyzed silica filler is allowed to cool and may be used in the foregoing formulation.

Alternatively, the pre-hydrolyzed terpene epoxy silane may be added directly to the resin-mix prior to the blending in of the silica filler. The results obtained are essentially the same in either case.

The following table shows electrical properties of the cured silica-filled epoxy resin composites initially and after boiling for 72 hours in water at sea level.

| ELECTRICAL PROPERTIES SILICA/EPOXY COMPOSITES INITIAL AND AFTER 72 HR. WATER BOIL | | | | |
|---|---|---|---|---|
| Example No. | Silica | Dielectric Constant | | Dissipation Factor | |
| 4 | PT* | 4.18 | 5.29 | 0.017 | 0.018 |
| 4 | PT | 4.39 | 5.44 | 0.011 | 0.024 |
| 4 | PT | 4.36 | 5.52 | 0.009 | 0.020 |
| 4 | IA** | 4.46 | 5.44 | 0.018 | 0.024 |
| 8 | PT | 4.50 | 5.51 | 0.018 | 0.024 |
| 8 | IA | 4.37 | 5.50 | 0.021 | 0.021 |
| 8 | IA | 4.36 | 5.46 | 0.011 | 0.025 |
| 8 | IA | 4.52 | 5.47 | 0.008 | 0.023 |
| 9 | PT | 4.36 | 5.56 | 0.014 | 0.021 |
| 9 | PT | 4.36 | 5.47 | 0.008 | 0.021 |
| 9 | IA | 4.37 | 5.47 | 0.010 | 0.027 |
| 9 | IA | 4.37 | 5.59 | 0.010 | 0.028 |
| 10 | IA | 4.38 | 5.42 | 0.013 | 0.022 |
| Untreated | | 4.48 | 6.07 | 0.018 | 0.069 |
| | | 4.35 | 6.82 | 0.011 | 0.142 |
| Commercial A | PT | 4.39 | 6.16 | 0.007 | 0.13 |
| | PT | 4.44 | 6.43 | 0.017 | 0.187 |
| | IA | 4.34 | 6.19 | 0.015 | 0.086 |
| | | 4.47 | 5.77 | 0.017 | 0.036 |
| Commercial B | PT | 4.45 | 6.19 | 0.009 | 0.101 |
| | PT | 4.35 | 6.12 | 0.020 | 0.129 |
| | IA | 4.46 | 5.50 | 0.015 | 0.074 |

*PT = pretreated silica
**IA = integral addition of silica to silane containing epoxy resin mix.

The foregoing table shows the surprising reduction in the change in the dielectric constant and in the change in dissipation factor between commercially available silica filled epoxy resins (Commercial A and Commercial B) and compositions of the present invention.

What is claimed is:

1. A silica filler having an average particle size in the range of 0.5 to 20 microns and a surface area of from 0.5 to 5 square meters per gram, the surface of said particles having coated thereon from 0.1% to about 2.5% by weight of an alkoxyepoxyterpene silane having the general formula:

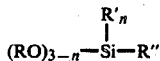

wherein R is $C_1$–$C_4$ alkyl, R' is $C_1$–$C_4$ alkyl and R" is a cyclic epoxyterpene radical or acyclic epoxyterpene radical connected to silicon through a silicon-carbon linkage, and n is 0, 1, or 2.

2. A silica filler as defined in claim 1 wherein R" contains 10 carbon atoms in the epoxyterpene radical.

3. A silica filler as defined in claim 1 wherein R is methyl.

4. A silica filler as defined in claim 1 wherein R is ethyl.

5. A silica filler as defined in claim 1 wherein R' is methyl and n is 1.

6. A silica filler as defined in claim 1 wherein R is methyl and n is 0.

7. A silica filler as defined in claim 1 wherein R is ethyl and n is 0.

8. A silica filler as defined in claim 1 wherein R" is dihydromyrcenyl-6,7-epoxide.

9. A silica filler as defined in claim 1 wherein R" is myrcenyl-6,7-epoxide.

10. A silica filler as defined in claim 1 wherein R" is epoxymenthyl.

11. A silica filler as defined in claim 1 wherein the alkoxyepoxyterpene silane is 3S-6,7-epoxycitronelly-triethoxysilane.

12. A silica filler as defined in claim 1 wherein the alkoxyepoxyterpene silane is 3S-6,7-epoxycitronellyl-methyldiethoxysilane.

13. A silica filler as defined in claim 1 wherein the alkoxyepoxyterpene silane is 3S-6,7-epoxycitronellyl-trimethoxysilane.

14. A silica filler as defined in claim 1 wherein the alkoxyepoxyterpene silane is 3S-6,7-epoxycitronellyl-methyldimethoxysilane.

15. A silica filler as defined in claim 1 wherein the alkoxyepoxyterpene silane is 6,7-geranyltriethoxysilane.

16. A silica filler as defined in claim 1 wherein the alkoxyepoxyterpene silane is 4R-1,2-epoxymenthyltriethoxysilane.

17. A silica filler as defined in claim 1 wherein the alkoxyepoxyterpene silane is a pre-hydrolyzed alkoxyepoxyterpene silane.

* * * * *